United States Patent
Zhou et al.

(10) Patent No.: US 11,761,393 B2
(45) Date of Patent: Sep. 19, 2023

(54) MULTIPLE COMBUSTION MODE ENGINE WITH AMMONIA FUEL AND CONTROL METHOD THEREOF

(71) Applicant: TIANJIN UNIVERSITY, Tianjin (CN)

(72) Inventors: Lei Zhou, Tianjin (CN); Zongkuan Liu, Tianjin (CN); Haiqiao Wei, Tianjin (CN); Lijia Zhong, Tianjin (CN); Gequn Shu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/052,834

(22) Filed: Nov. 4, 2022

(65) Prior Publication Data

US 2023/0220809 A1    Jul. 13, 2023

(30) Foreign Application Priority Data

Jan. 13, 2022 (CN) .......................... 202210038687.2

(51) Int. Cl.
*F02D 41/00* (2006.01)
*F02D 41/30* (2006.01)
(Continued)

(52) U.S. Cl.
CPC .......... *F02D 41/0027* (2013.01); *F02B 19/10* (2013.01); *F02B 19/108* (2013.01); *F02B 19/1085* (2013.01); *F02B 19/12* (2013.01); *F02D 35/028* (2013.01); *F02D 41/3041* (2013.01); *F02M 21/0206* (2013.01);
(Continued)

(58) Field of Classification Search
CPC ................ F02B 19/00–18; F02B 21/00; F02D 19/0639–0657; F02M 21/02–0218; F02M 21/0248; F02M 2200/95
See application file for complete search history.

(56) References Cited

U.S. PATENT DOCUMENTS

| 3,455,282 A | * | 7/1969 | Pearsall | ................. F02M 21/00 123/1 R |
| 5,085,189 A | * | 2/1992 | Huang | .................. F02B 19/108 123/275 |

(Continued)

FOREIGN PATENT DOCUMENTS

| CN | 112796870 A | * | 5/2021 | .......... F02B 19/1066 |
| GB | 2073317 A | * | 10/1981 | .............. F02B 19/10 |

*Primary Examiner* — John M Zaleskas
(74) *Attorney, Agent, or Firm* — Gurr Brande & Spendlove, PLLC; Robert A. Gurr

(57) ABSTRACT

Disclosed is a multiple combustion mode engine with ammonia fuel including an cylinder head, a cylinder sleeve, a piston, a main combustion chamber, an inlet valve and an exhaust valve, and further including a jet ignition device arranged on the cylinder head and used for providing an ignition source for the main combustion chamber, and an ammonia injector used for providing ammonia/air mixture gas for the main combustion chamber. Also disclosed is a control method of the multiple combustion mode engine with ammonia fuel. The time sequence of ammonia injection of the main combustion chamber and jet flame generation of the pre-chamber is controlled, the mixed state of the fuel/air in the main combustion chamber before ignition can be controlled, and finally different combustion modes, i.e. a premixed combustion mode and a diffusion combustion mode, are formed in the main combustion chamber.

2 Claims, 4 Drawing Sheets

(51) Int. Cl.
*F02M 21/02* (2006.01)
*F02B 19/10* (2006.01)
*F02B 19/12* (2006.01)
*F02D 19/06* (2006.01)
*F02D 35/02* (2006.01)

(52) U.S. Cl.
CPC ..... *F02M 21/0248* (2013.01); *F02D 19/0644* (2013.01); *F02M 2200/95* (2013.01)

(56) References Cited

U.S. PATENT DOCUMENTS

| | | | | |
|---|---|---|---|---|
| 11,060,443 | B1* | 7/2021 | Thomas | F02M 61/14 |
| 11,085,402 | B1* | 8/2021 | Vroman | F02M 23/04 |
| 11,255,240 | B1* | 2/2022 | Glugla | F02P 15/02 |
| 11,352,968 | B1* | 6/2022 | Kiwan | F02D 41/0087 |
| 2008/0236546 | A1* | 10/2008 | Kaku | F02B 23/0663 |
| | | | | 123/299 |
| 2011/0259290 | A1* | 10/2011 | Michikawauchi | F02D 19/0692 |
| | | | | 123/1 A |
| 2011/0264355 | A1* | 10/2011 | Iwatani | F02M 43/00 |
| | | | | 123/575 |
| 2011/0265464 | A1* | 11/2011 | Kojima | F02M 25/0224 |
| | | | | 60/299 |
| 2015/0260131 | A1* | 9/2015 | Riley | F25J 3/04533 |
| | | | | 123/542 |
| 2015/0354481 | A1* | 12/2015 | Geckler | F02B 19/108 |
| | | | | 123/274 |
| 2016/0230645 | A1* | 8/2016 | Schock | F02B 19/1052 |
| 2017/0122184 | A1* | 5/2017 | Hampson | F02D 41/402 |
| 2018/0003132 | A1* | 1/2018 | Ginter | F02B 19/1019 |
| 2019/0024571 | A1* | 1/2019 | Wang | F02B 19/12 |
| 2021/0262408 | A1* | 8/2021 | Glugla | F02D 41/3094 |
| 2023/0034824 | A1* | 2/2023 | Zhang | F02M 37/04 |

* cited by examiner

MULTIPLE COMBUSTION MODE ENGINE WITH AMMONIA FUEL AND CONTROL METHOD THEREOF

CROSS REFERENCE TO RELATED APPLICATION

This patent application claims the benefit and priority of Chinese Patent Application No. 202210038687.2 filed on Jan. 13, 2022, the disclosure of which is incorporated by reference herein in its entirety as part of the present application.

TECHNICAL FIELD

The present disclosure relates to the technical field of internal combustion engines, in particular to a multiple combustion mode engine with ammonia fuel based on a turbulent jet ignition mode and a control method of the multiple combustion mode engine with ammonia fuel.

BACKGROUND ART

Global climate warming, sea level rising and the like caused by excessive emission of carbon dioxide are significant problems faced by all countries in the world. Carbon dioxide emission reduction becomes a key element for development of the transportation industry, and the development of carbon-free fuel becomes an important solution for reducing carbon emission. Ammonia is used as a nitrogen-hydrogen compound, and no carbon dioxide is generated during combustion, which has a huge potential of carbon reduction. In addition, ammonia gas is convenient to store and transport and has a stable supply chain. Therefore, ammonia fuel is considered as a potential stock for engines to achieve zero-carbon emission.

When ammonia gas is used as engine fuel, $CO_2$ is not generated by combustion, and the octane number of the ammonia gas is as high as 130, so that the engine can achieve a higher compression ratio. However, the ammonia combustion characteristics are poor. Specifically, the spontaneous combustion temperature is high, the propagation speed of the flame is low, and the flammable range is narrow, so that an engine with ammonia fuel faces the problems of unstable combustion, low efficiency, poor performance and the like. In addition, when the in-cylinder combustion conditions are poor, the engine also faces the risks of nitrogen oxide emission increase and ammonia escape. Therefore, the development of an efficient clean combustion mode is a big challenge faced by engines with ammonia fuel.

Turbulent jet ignition (TJI) is a technology that can improve the engine combustion stability and broaden the lean-burn limit. The turbulent jet ignition system mainly includes a pre-chamber provided with a spark plug and a fuel injector. Flame of the pre-chamber interacts with a jet hole. Turbulent jet flame is formed in a main combustion chamber to provide more ignition energy, and multi-point ignition of the main combustion chamber is achieved. Compared with a single-point ignition mode of traditional Spark ignition (SI), TJI has the following benefit: the ignition capacity is higher, stable combustion in a cylinder can be effectively promoted, and the combustion rate is increased. Theoretically, the defects that the engine with ammonia fuel is difficult to ignite and unstable in combustion can be effectively compensated by the super-strong ignition effect of the TJI system.

Researches show that the load range of stable operation of the engine with ammonia fuel is small. The engine with ammonia fuel can only stably operate within the range that the excess air coefficient is 0.9-1.1, and the stable combustion range of the engine with ammonia fuel can be effectively expanded by means of the turbulent jet ignition system. Meanwhile, the engine, especially the engine with ammonia fuel, is widely faced with the problems of cold starting and idling instability. The problem faced by the engine is more serious due to the characteristic that ammonia is difficult to fire. Research shows that the premixed combustion mode can effectively improve the cold starting performance of the engine and reduce emission in the cold starting stage. If homogeneous premixed gas is provided for filling in a cylinder of the ignition type engine, the cold starting performance of the spark ignition engine is obviously superior to that of a compression ignition type engine in a diffusion combustion mode, and it is shown that the premixed combustion mode has certain advantages in cold starting and small-load working conditions of the engine. However, under operating with middle load and high load, the premixed combustion mode of the engine usually faces the problems of low heat efficiency, insufficient power and the like. In this case, the advantages of the engine in the diffusion combustion mode are apparent. Based on the analysis above, a proper combustion mode is selected according to different operating conditions and workloads of the engine, so that the heat efficiency and the dynamic property of the engine are better improved, and the emission is lower.

Researches show that the ignition point of ammonia gas is high and compression ignition is difficult, so that an ammonia gas compression ignition engine usually needs high-activity pilot fuel to be ignited. The jet ignition device can provide stronger ignition energy and can play a role similar to that of pilot fuel. Therefore, diffusion combustion of ammonia gas can be realized by means of the jet ignition device. When the ammonia gas is diffusely combusted, due to the fact that the combustion temperature is low and a nitrogen oxide generation mechanism is not generated, NOx emission is controlled, and no particulate matter is generated when the ammonia gas serves as fuel. In addition, the ammonia gas does not contain carbon element, and unburned hydrocarbon is not generated.

Therefore, a proper combustion strategy needs to be formulated according to the operating conditions of the engine with ammonia fuel, and an in-cylinder combustion mode needs to be optimized, so that the adverse effect of poor ammonia combustion characteristics on the engine is compensated. Finally, the purposes of improving the performance of the engine with ammonia fuel and reducing emission are achieved.

SUMMARY

The object of some embodiments is to provide a multiple combustion mode engine with ammonia fuel based on a turbulent jet ignition mode and a control method of the multiple combustion mode engine with ammonia fuel. On one hand, an jet ignition device is provided for producing stable and controllable jet flame and providing an ignition source for the main combustion chamber, so that stable ignition combustion of the main combustion chamber is guaranteed, stable combustion of the ammonia fuel engine is promoted, and meanwhile the feasibility of the conversion of combustion mode is achieved; on the other hand, in cooperation with an ammonia injector with variable injection timing, the time sequence of ammonia injection of the main combustion chamber and jet flame generation of the pre-chamber is controlled, thus the mixed state of the fuel/air in the main combustion chamber before ignition can be controlled, and finally different combustion modes are formed in the main combustion chamber, so that efficient and stable combustion of the engine with ammonia fuel under the conditions of multiple operating conditions and wide load range is achieved.

The purpose of the present disclosure is realized through the following technical solutions.

For the first purpose of the present disclosure, disclosed is a multiple combustion mode engine with ammonia fuel based on a turbulent jet ignition mode. The multiple combustion mode engine with ammonia fuel includes an cylinder head, a cylinder sleeve, a piston, a main combustion chamber, an inlet valve and an exhaust valve, and further including a jet ignition device arranged on the cylinder head and used for providing an ignition source for the main combustion chamber, and an ammonia injector arranged beside the jet ignition device and used for providing ammonia/air mixture for the main combustion chamber, where the ammonia injector is independently controlled by an electronic control unit (ECU) of the engine; the jet ignition device includes an air injector, a fuel injector, a spark plug and a pre-chamber for producing a jet flame, a nozzle of the air injector extends into the pre-chamber and is used for injecting air into the pre-chamber, and a nozzle of the fuel injector extends into the pre-chamber and is used for injecting fuel into the pre-chamber; the spark plug, the nozzle of the air injector and the nozzle of the fuel injector are arranged at a same side of the pre-chamber; the air injector and the fuel injector are controlled through cooperation of the electronic control unit and an ammonia injection system of the engine; and the pre-chamber communicates with the main combustion chamber through a jet hole.

Further, the fuel in the fuel injector is selected from one of diesel, gasoline, natural gas and ammonia gas. Preferably, the fuel in the fuel injector is ammonia gas.

Further, the jet ignition device includes a first housing, and the first housing is mounted on the cylinder head through threads; a second housing is arranged at the bottom of the first housing, a spark plug is mounted at the bottom of the first housing, and an electrode of the spark plug extends into the second housing; the jet hole is formed at the bottom of the second housing to realize accelerated propagation of pre-chamber flame, so that the combustion rate is improved; the air injector and the fuel injector which are vertically arranged are mounted in the first housing, and the electrode of the spark plug, the nozzle of the air injector, the nozzle of the fuel injector and the second housing form the pre-chamber.

Further, a diameter of the jet hole ranges from 4 mm to 10 mm.

Further, an included angle between an axial direction of the jet ignition device and an other axial direction of a nozzle of the ammonia injector is 40° to 60°.

For the second purpose, also disclosed is a control method of a multiple combustion mode engine with ammonia fuel based on a turbulent jet ignition mode, including:

1) a premixed combustion mode: under starting, idling and small-load working condition of the engine, upon predetermining a first timing when a jet flame of a pre-chamber included in the engine is generated, enabling a second timing when an ammonia injector included in the engine injects ammonia gas in a main combustion chamber included in the engine to be earlier than the first timing when the jet flame of the pre-chamber is generated in the main combustion chamber; mixing the ammonia gas entering the main combustion chamber with air in the main combustion chamber to form homogeneous premixed gas; under a compression action of a piston included in the engine, igniting the homogeneous premixed gas by the jet flame of the pre-chamber near the top dead center of the compression stroke, spreading and developing a flame of the homogeneous premixed gas, and completing a combustion process by the engine; and 2) a diffusion combustion mode: upon the engine operating under middle-or-high load working condition, injecting the ammonia gas to the main combustion chamber near the top dead center of the compression stroke by the ammonia injector; enabling the second timing when the ammonia injector injects the ammonia gas to be slightly later than the first timing when the jet flame of the pre-chamber is generated, or injecting the ammonia gas by the ammonia injector at the first timing when the jet flame of the pre-chamber is generated; and synchronously performing injection of the ammonia gas in the main combustion chamber and mixture of the ammonia gas injected by the ammonia injector with the air in the main combustion chamber, where the ammonia gas and the air in the main combustion chamber are in a non-premixed state.

Further, before the jet flame of the pre-chamber is generated, the method further including adjusting gas in the pre-chamber to be equivalent mixed gas, where adjusting gas in the pre-chamber to be equivalent mixed gas includes:

allowing gas in the main combustion chamber to enter the pre-chamber through a jet hole included in the engine; in response to an excess air coefficient of mixed gas in the main combustion chamber being smaller than 1, forming first mixed gas that is over-rich in the pre-chamber, injecting fresh air into the pre-chamber by an air injector of a jet ignition device included in the engine until the first mixed gas in the pre-chamber is the equivalent mixed gas; and in response to the excess air coefficient of the mixed gas in the main combustion chamber being larger than 1, leaving the air injector not work, and injecting fuel into the pre-chamber by a fuel injector included in the engine to increase concentration of second mixed gas in the pre-chamber until the second mixed gas in the pre-chamber is the equivalent mixed gas.

Compared with the prior art, the present disclosure has the following beneficial effects.

The pre-chamber is connected with the nozzle of the fuel injector, and the main combustion chamber is connected with the nozzle of the ammonia injector. Namely, the pre-chamber and the main combustion chamber are both provided with fuel injectors, so that the engine can flexibly adjust the mixed gas during actual operation. In this way, an equivalent mixed gas in the pre-chamber can be ensured when the mixed gas in the main combustion chamber is too lean or too thick, and then the stability of ignition and the propagation of the initial flame is further ensured.

In the multiple combustion mode engine with ammonia fuel, according to the actual working condition and working load of the engine, the time sequence of ammonia injection of the main combustion chamber and jet flame generation of the pre-chamber is controlled, the mixed state of both fuel and air in the main combustion chamber before ignition is adjusted, and finally different combustion modes, i.e. a premixed combustion mode and a diffusion combustion mode, are formed in the main combustion chamber, so that efficient and stable combustion of the engine with ammonia fuel under the conditions of multiple operating conditions and wide load range is facilitated.

The engine according to the present disclosure can be extended to other engine with gas and alcohol fuel, such as natural gas engines, methanol engines and the like. Meanwhile, by taking advantage of induced combustion of the pre-chamber, hydrogen generated in the reforming process of ammonia gas or methanol fuel can be introduced into the pre-chamber, so that more stable ignition and a rapid flame propagation process are realized.

REFERENCE SIGNS 1 piston; 2 main combustion chamber; 3 inlet valve; 4 jet ignition device; 5 ammonia injector; 6 exhaust valve; 7 cylinder head; 8 cylinder sleeve; 9 spark plug; 10 first housing; 11 air injector; 12 fuel injector; 13 pre-chamber; 14 jet hole; 15 jet flame; 16 homogeneous premixed gas; 17 ammonia gas spray beam; and 18 second housing.

DETAILED DESCRIPTION OF THE EMBODIMENTS

In order to make the objectives, technical solutions and beneficial technical effects and notable progresses of this application clearer, the following clearly and completely describes the technical solutions in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Embodiments

According to a multiple combustion mode engine with ammonia fuel based on a turbulent jet ignition mode, the advantage of stable combustion in a cylinder can be promoted based on a jet ignition device. The time sequence of ammonia fuel injection of a main combustion chamber and jet generation of a pre-chamber is adjusted by advancing or postponing the ammonia injection time of the main combustion chamber so as to change the mixed state of a working medium during combustion of the main combustion chamber. Finally, different combustion modes, namely a premixed combustion mode and a diffusion combustion mode, are formed in the main combustion chamber. The specific embodiments, including an embodiment of a jet ignition device of the pre-chamber and a control mode of multiple combustion modes, are further described below with reference to the attached figures.

Figure 1:
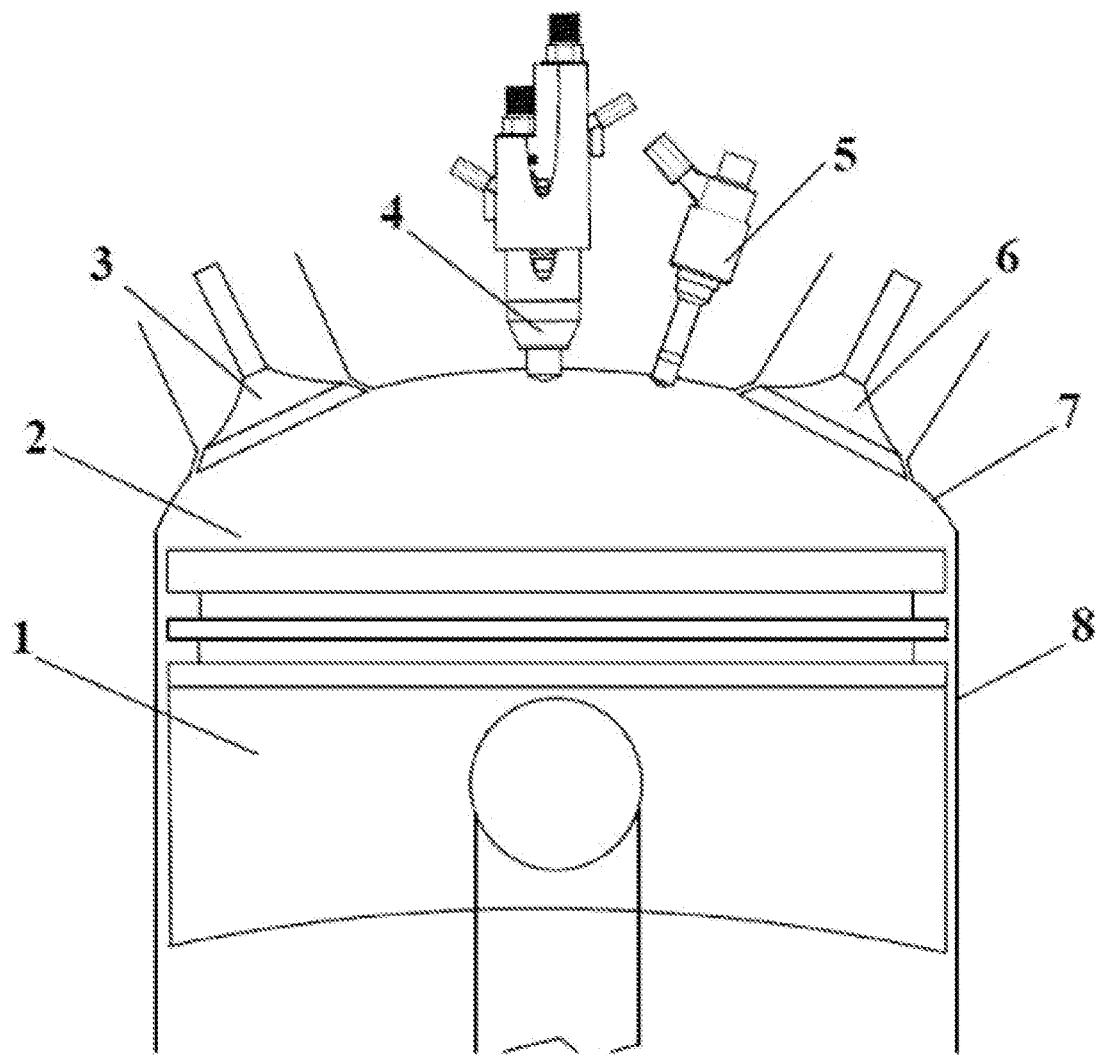
FIG. 1 is an integral structural schematic diagram of a multiple combustion mode engine with ammonia fuel according to embodiments of the disclosure.

As shown in FIG. 1, a multiple combustion mode engine with ammonia fuel based on a turbulent jet ignition mode includes a cylinder sleeve 8 and a cylinder head 7 arranged at the top of the cylinder sleeve 8; and an inlet valve 3, an exhaust valve 6, an ammonia injector 5 and a jet ignition device 4 are arranged at the top of the cylinder head 7. The inlet valve 3 is arranged in an air inlet channel, the exhaust valve 6 is arranged in an exhaust channel, and the piston 1 is arranged in the cylinder sleeve 8. The cylinder head 7, the jet ignition device 4 and the piston 1 jointly form the main combustion chamber 2, the jet ignition device 4 is located over the main combustion chamber or can be offset in relation to the main combustion chamber, whereas needs to be positioned cooperatively with the ammonia injector 5. Namely, the jet ignition device 4 and the ammonia injector 5 are arranged adjacently, and an included angle between an axial direction of the jet ignition device 4 and an axial direction of a nozzle of the ammonia injector 5 is 40°. The ammonia injector 5 is located beside the jet ignition device 4 and used for providing ammonia gas for the main combustion chamber so as to form mixed gas with air in the main combustion chamber. Then, ignition is achieved through the jet ignition device 4. The ammonia injector 5 is independently controlled through an electronic control unit (ECU) of the engine. The air injector 11 and the fuel injector 12 are controlled through cooperation of the ECU and an ammonia injection system of the engine.

Figure 2:
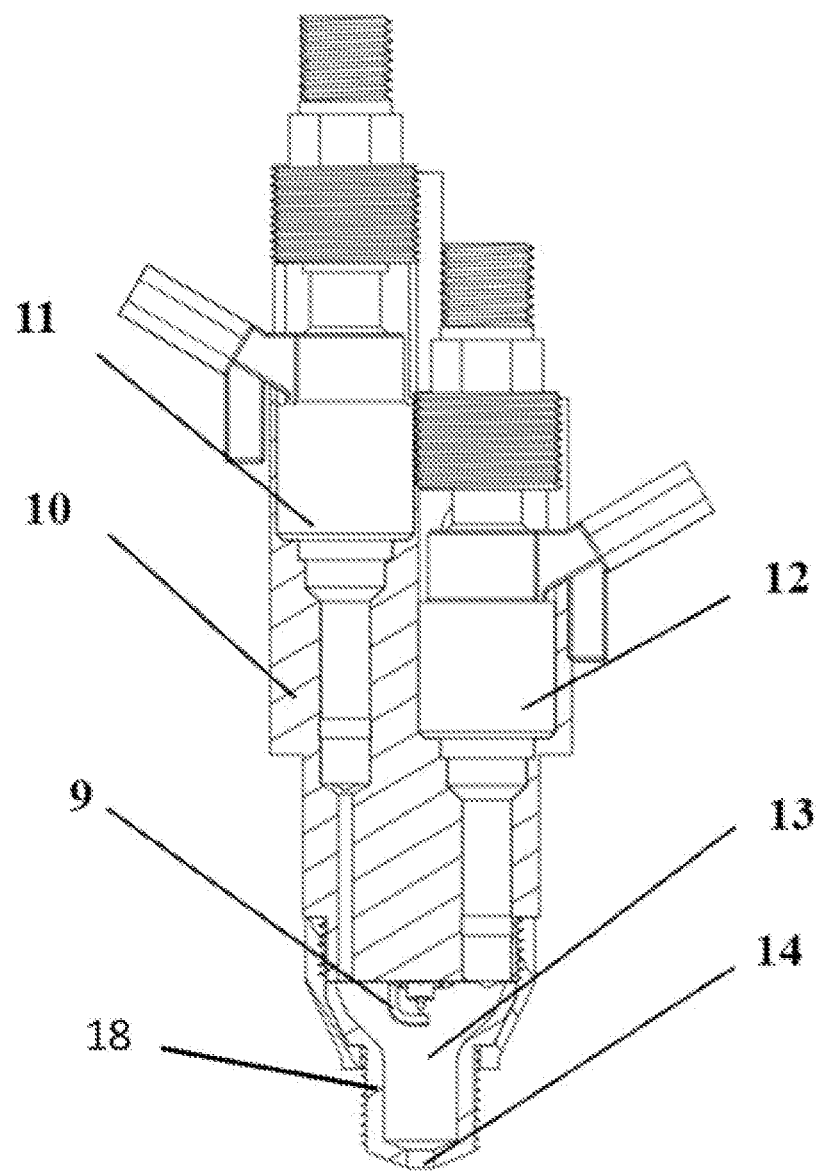
FIG. 2 is a cross-section diagram of a jet ignition device according to embodiments of the disclosure.

As shown in FIG. 2, the jet ignition device 4 includes a first housing 10, and the first housing 10 is mounted on the cylinder head 7 through threads. A second housing 18 is arranged below the first housing 10, a spark plug 9 is mounted at the bottom of the first housing 10, and an electrode of the spark plug 9 extends into the second housing 18. A jet hole 14 is formed in the bottom of the second housing 18, a nozzle of the pre-chamber is formed at the bottom of the second housing 18, and an opening of the nozzle of the pre-chamber aligns to the jet hole 14. And, the jet hole 14 is used for realizing accelerated propagation of flame. The air injector 11 and the fuel injector 12 which are vertically arranged are mounted in the first housing 10. The air injector 11 and the fuel injector 12 are each fixed to the first housing 10 through a compression bolt. The compression bolt is provided with a through hole, and the two ends of the compression bolt are provided with threads. One end of the compression bolt is connected with the first housing 10 through threads and used for fixing the air injector 11 or the fuel injector 12, and the other end of the compression bolt is used for being connected with an air path or an oil path. The through hole of the compression bolt is used for feeding air into the air injector 11 or feeding ammonia gas into the fuel injector 12.

The nozzle of the air injector 11 extends into the second housing 18 for injecting air into the pre-chamber, and the nozzle of the fuel injector 12 extends into the second housing 18 for injecting fuel into the pre-chamber. The electrode of the spark plug 9, the nozzle of the air injector 11, the nozzle of the fuel injector 12 and the second housing 18 form the pre-chamber, and the pre-chamber 13 communicates with the main combustion chamber 2 through the jet hole 14. Moreover, the spark plug 9, the nozzle of the air injector 11 and the nozzle of the fuel injector 12 are arranged at the same side of the pre-chamber 13. The fuel in the fuel injector is selected from one of diesel, gasoline, natural gas, and ammonia gas. In order to simplify the structure of the engine with ammonia fuel, the fuel injector is used for injecting ammonia gas to the pre-chamber, so that it can avoid the situation that corresponding equipment needs to be additionally arranged when diesel oil, gasoline or natural gas is selected.

In addition to the fuel injector 12 installed in the pre-chamber, another high-flow ammonia injector 5 is installed in the main combustion chamber 2 to provide required mixed gas for the main combustion chamber 2. Namely, the pre-chamber and the main combustion chamber 2 are both provided with fuel injectors, so that the engine can flexibly adjust the mixed gas during actual operation. Further, an equivalent mixed gas in the pre-chamber can be ensured when the mixed gas in the main combustion chamber 2 is too lean or too thick, and thus the stability of ignition and the propagation of the initial flame are further ensured. Flame in the pre-chamber can generate a flame acceleration phenomenon when the flame passes through the jet hole to form a turbulent jet flame, so that the combustion rate in the main combustion chamber 2 is increased, the fuel consumption of the engine can be obviously reduced, and the heat efficiency of the engine is improved.

According to the multiple combustion mode engine with ammonia fuel, different combustion modes can be switched according to the operating condition, the working load and the like of the engine. Upon predetermining a timing when jet flame 15 in the pre-chamber is generated, working medium in different states, namely a premixed state or a non-premixed state, can be formed before the main combustion chamber 2 is ignited by adjusting the time of the injection of the ammonia injector 5. Then, under the ignition effect of the jet flame 15 of the pre-chamber, the mixed gas in different states is combusted in different combustion modes including the pre-mixed combustion mode and the diffusion combustion mode. The pre-mixed combustion mode is that the fuel is ignited by the jet flame from the pre-chamber and the flame propagates and spreads; and the diffusion combustion mode is that the jet flame from the pre-chamber generates high-temperature combustion products to form a hot atmosphere, and ammonia fuel is injected into the hot atmosphere to form diffusion combustion.

A control method of a multiple combustion mode engine with ammonia fuel based on a turbulent jet ignition mode specifically includes the following steps.

Figure 3:
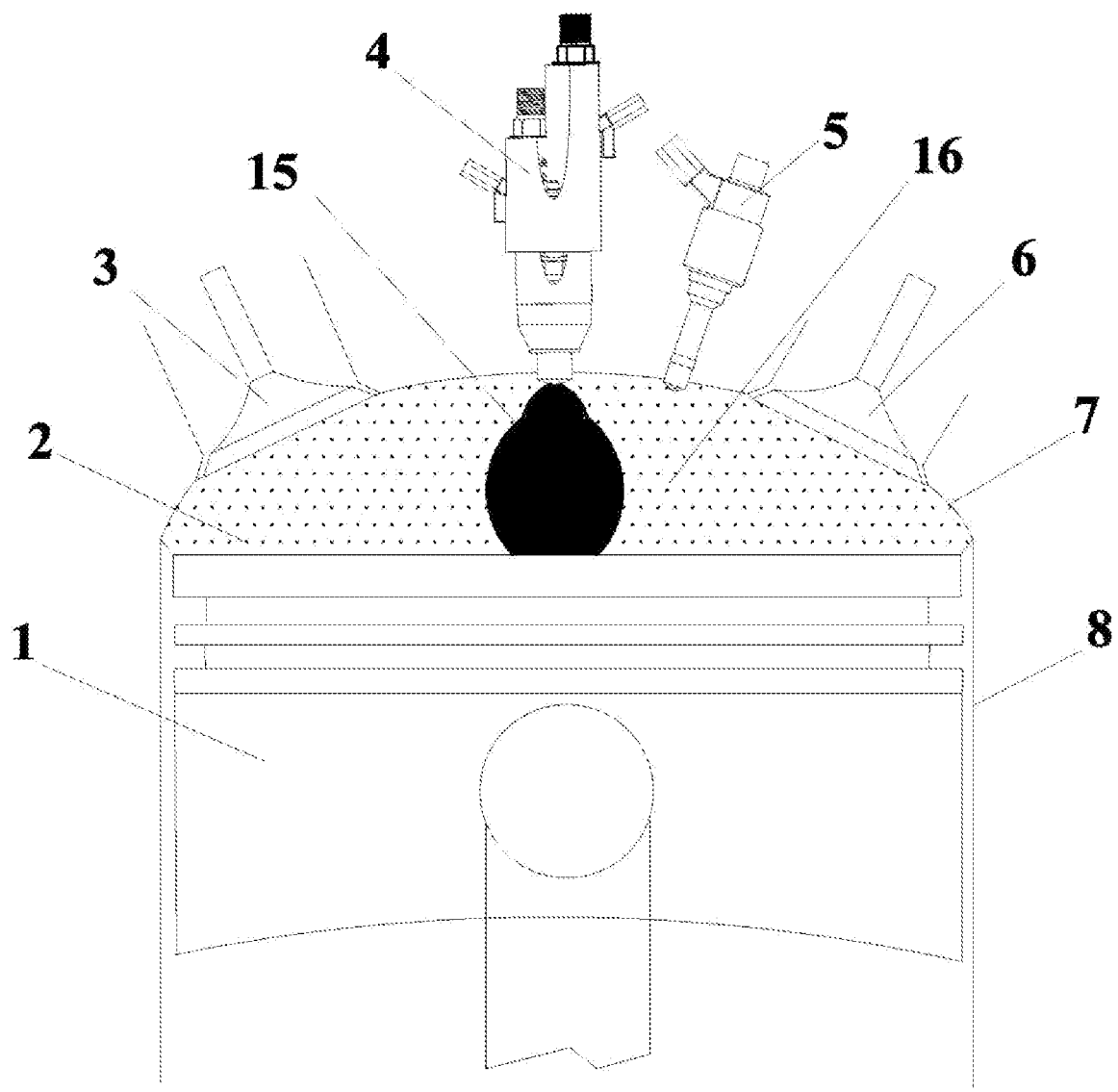
FIG. 3 is a schematic diagram of the engine in a premixed combustion mode of a main combustion chamber thereof under starting, idling and small-load working condition of the engine.

Firstly, under starting, idling, and small-load working condition of the engine, a premixed combustion mode is adopted, so that the combustion stability of the engine is guaranteed, and the emission is reduced. The method includes the following specific operations: upon predetermining a first timing when the jet flame 15 of the pre-chamber is generated, the injection timing of the ammonia injector 5 in the main combustion chamber 2 is set relatively in advance. Ammonia gas can be injected during a period from a timing when the inlet valve 3 and the exhaust valve 6 are closed to the first timing when the jet flame 15 is generated. Namely, a second timing when the ammonia is injected in the main combustion chamber 2 is much earlier than the third timing when the jet flame 15 of the pre-chamber is generated. The ammonia gas enters the main combustion chamber 2 and is firstly mixed with air to form homogeneous premixed gas. Then, the temperature and the pressure of the homogeneous premixed gas are both increased under the compression action of the piston 1. The homogeneous premixed gas is ignited by the jet flame of the pre-chamber 13 near the top dead center of the compression stroke, and a flame of the homogeneous premixed gas is spread in the pre-chamber firstly, and then the flame is accelerated by a nozzle of the pre-chamber to form the jet flame 15. The jet flame 15 enters the main combustion chamber through the jet hole to ignite the homogeneous premixed gas in the main combustion chamber of the engine, the engine completes combustion process, and the process is as shown in FIG. 3. In this case, the combustion mode in the main combustion chamber 2 is mainly the premixed combustion mode, the engine has good performance of the cold starting, the cold starting and emission under the small-load working condition can be reduced, and the combustion stability is improved.

Figure 4:
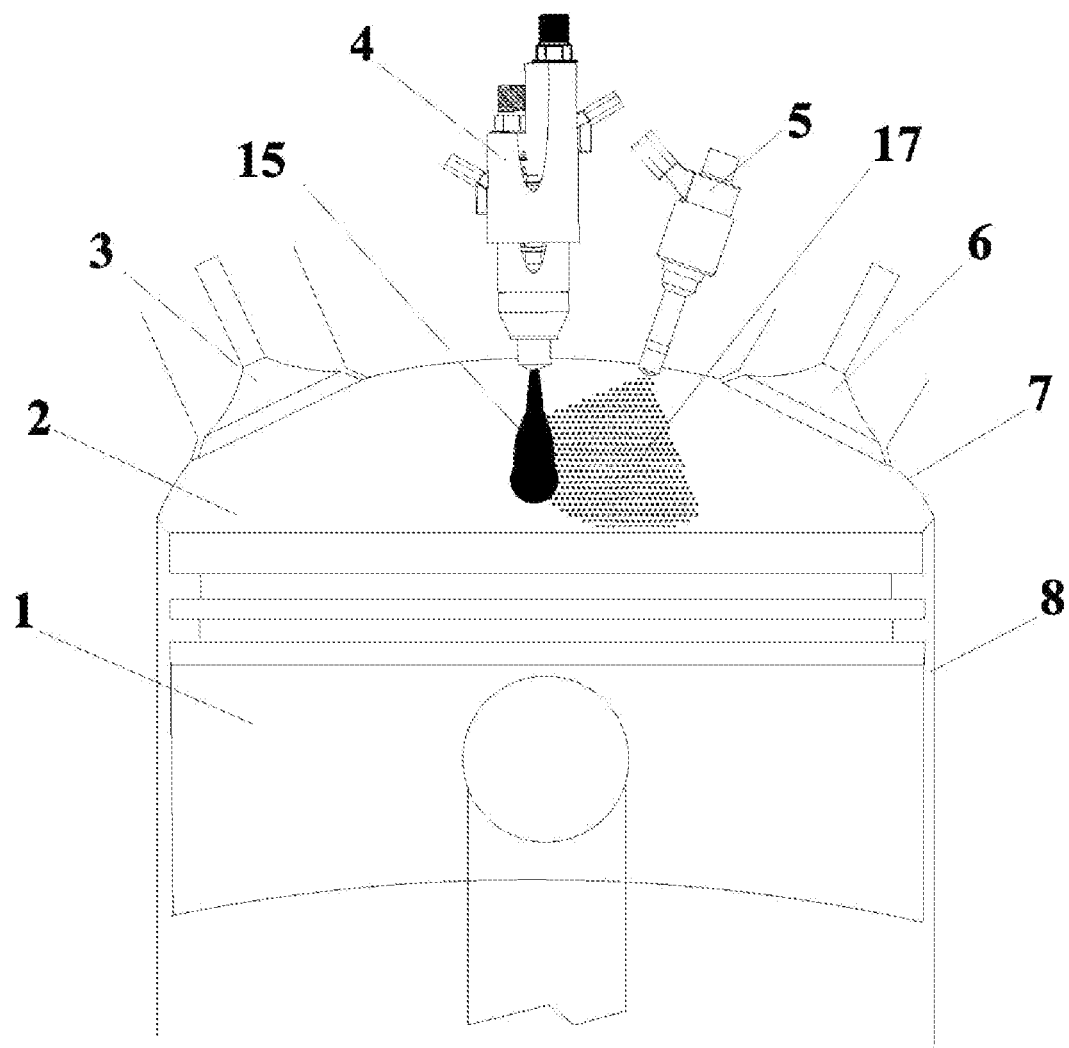
FIG. 4 is a schematic diagram of the engine in a diffusion combustion mode of a main combustion chamber thereof under middle-or-high load working condition of the engine.

Secondly, when the engine operates under middle-or-high load working condition, the timing when ammonia gas is injected in the main combustion chamber 2 is delayed and is approaching a timing at the top dead center of the compression stroke. The timing when ammonia gas is injected can be slightly later than the predetermined first timing when the jet flame 15 of the pre-chamber is generated, and the ammonia gas can also be synchronously injected when the jet flame of the pre-chamber is generated. The jet flame of the pre-chamber forms widely distributed hot spots in the main combustion chamber, so that the temperature and the pressure in the main combustion chamber are further increased. An ammonia gas spray beam 17 is in a state of being mixed while firing under the influence of the jet flame 15. Namely, the fuel and air in the main combustion chamber 2 are not pre-mixed, and the combustion is thickest near the top dead center of the compression stroke, and the process is as shown in FIG. 4. In this case, the combustion mode in the main combustion chamber 2 is mainly a diffusion combustion mode, most of ammonia gas is combusted near the top dead center of the compression stroke, the combustion duration is relatively short, and the engine can obtain higher heat efficiency. Meanwhile, the combustion temperature of the ammonia gas is low, so that the NOx generation is not facilitated, and the emission performance of the engine is improved.

The starting, idling, small-load working condition of the engine, and the middle-or-high load working condition of the engine referred to by the present disclosure are all working conditions well known by those skilled in the field of engines. As an example, the starting working condition refers to the working condition that the rotating speed of the engine is lower than 400 r/min; the idling working condition refers to the working condition that no power is output by the engine, namely, the idling rotating speed of the engine is generally 700-900 r/min; the small-load working condition refers to the working condition that the opening degree of the throttle valve of the engine is within 25%; and the middle-or-high load working condition of the engine refer to the condition that the opening degree of the throttle valve is larger than 25%.

In the above two working conditions, before the jet flame of the pre-chamber is generated, the control method further includes the step of adjusting gas in the pre-chamber to be the equivalent mixed gas, specifically including the following steps.

During the compression stroke, the gas in the main combustion chamber 2 enters the pre-chamber 13 through the jet hole 14, and the diameter of the jet hole is 4-10 mm. When the excess air coefficient of the mixed gas in the main combustion chamber 2 is smaller than 1, namely, when the air and ammonia mixed gas in the main combustion chamber 2 is too thick, the thick mixed gas is formed in the pre-chamber 13, the air injector 11 of the jet ignition device 4 injects fresh air into the pre-chamber 13 to increase the oxygen concentration of the mixed gas in the inner cavity of the pre-chamber until the mixed gas in the pre-chamber is the equivalent mixed gas.

When the excess air coefficient of the mixed gas in the main combustion chamber 2 is larger than 1, namely, when the mixed gas in the main combustion chamber 2 is too lean, the air injector 11 does not work, and only the fuel injector 12 injects fuel into the pre-chamber 13 to increase the concentration of the mixed gas in the pre-chamber until the mixed gas in the pre-chamber is the equivalent mixed gas for maintaining the equivalent combustion.

Then, the spark plug 9 ignites the equivalent mixed gas in the pre-chamber 13 to form an initial fire core; the initial fire core is spread in the pre-chamber 13 and interacts with the jet hole 14 to form the jet flame 15 as shown in FIG. 3 or FIG. 4, and then the mixed gas in the main combustion chamber 2 is ignited, so that the engine completes combustion process. The jet flame 15 generated by the jet ignition device 4 can improve the combustion rate and the combustion stability in the main combustion chamber 2.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure, non-essential improvements and adjustments to the present disclosure made by those skilled in the art according to the present disclosure, which all fall in the scope of protection of the present disclosure.

What is claimed is:

1. A control method of a multiple combustion mode engine with ammonia fuel, comprising:

a premixed combustion mode: under starting, idling and small-load working condition of the engine, upon pre-determining a first timing when a jet flame of a pre-chamber comprised in the engine is generated, enabling a second timing when an ammonia injector comprised in the engine injects ammonia gas in a main combustion chamber comprised in the engine to be earlier than the first timing when the jet flame of the pre-chamber is generated in the main combustion chamber; mixing the ammonia gas entering the main combustion chamber with air in the main combustion chamber to form homogeneous premixed gas; under a compression action of a piston comprised in the engine, igniting the homogeneous premixed gas by the jet flame of the pre-chamber near a top dead center of the compression stroke of the engine, spreading and developing a flame of the homogeneous premixed gas, and completing a combustion process by the engine; and a diffusion combustion mode: upon the engine operating under middle-or-high load working condition, injecting the ammonia gas to the main combustion chamber near the top dead center of the compression stroke of the engine by the ammonia injector; enabling the second timing when the ammonia injector injects the ammonia gas to be slightly later than the first timing when the jet flame of the pre-chamber is generated, or injecting the ammonia gas by the ammonia injector at the first timing when the jet flame of the pre-chamber is generated; and synchronously performing injection of the ammonia gas in the main combustion chamber and mixture of the ammonia gas injected by the ammonia injector with the air in the main combustion chamber, wherein the ammonia gas and the air in the main combustion chamber are in a non-premixed state.

2. The control method of a multiple combustion mode engine with ammonia fuel according to claim 1, before the jet flame of the pre-chamber is generated, the method further comprising adjusting gas in the pre-chamber to be equivalent mixed gas, wherein adjusting gas in the pre-chamber to be equivalent mixed gas comprises:

allowing gas in the main combustion chamber to enter the pre-chamber through a jet hole comprised in the engine; in response to an excess air coefficient of mixed gas in the main combustion chamber being smaller than 1, forming first mixed gas that is over-rich in the pre-chamber, injecting fresh air into the pre-chamber by an air injector of a jet ignition device comprised in the engine until the first mixed gas in the pre-chamber is the equivalent mixed gas; and in response to the excess air coefficient of the mixed gas in the main combustion chamber being larger than 1, leaving the air injector not work, and injecting fuel into the pre-chamber by a fuel injector comprised in the engine to increase concentration of second mixed gas in the pre-chamber until the second mixed gas in the pre-chamber is the equivalent mixed gas.

\* \* \* \* \*